(12) United States Patent
Uchihashi et al.

(10) Patent No.: US 8,558,507 B2
(45) Date of Patent: Oct. 15, 2013

(54) SECONDARY BATTERY STORAGE SYSTEM RACK WITH FIRE EXTINGUISHER DEVICE

(75) Inventors: Kenji Uchihashi, Moriguchi (JP);
Hiroto Nagano, Moriguchi (JP);
Yoshiyuki Ishizuka, Moriguchi (JP);
Takeshi Nakashima, Moriguchi (JP);
Takehito Ike, Moriguchi (JP)

(73) Assignee: Sanyo Electric Co., Ltd. (JP)

( * ) Notice: Subject to any disclaimer, the term of this patent is extended or adjusted under 35 U.S.C. 154(b) by 28 days.

(21) Appl. No.: 13/426,971

(22) Filed: Mar. 22, 2012

(65) Prior Publication Data

US 2012/0176080 A1 Jul. 12, 2012

Related U.S. Application Data

(63) Continuation of application No. PCT/JP2011/067347, filed on Jul. 28, 2011.

(30) Foreign Application Priority Data

Jul. 30, 2010 (JP) .................................. 2010-172110
Oct. 15, 2010 (JP) .................................. 2010-232044

(51) Int. Cl.
*H02J 7/00* (2006.01)
*A62C 29/00* (2006.01)

(52) U.S. Cl.
USPC .................................. 320/128; 169/51; 169/56

(58) Field of Classification Search
USPC .......... 320/128, 134, 137; 169/10, 29, 51, 54, 169/56
See application file for complete search history.

(56) References Cited

U.S. PATENT DOCUMENTS

| | | | | |
|---|---|---|---|---|
| 4,418,757 A * | 12/1983 | Merkel | ........................... | 169/54 |
| 5,947,208 A * | 9/1999 | Ha | ................... | 169/51 |
| 7,764,496 B2 * | 7/2010 | Nguyen et al. | ................ | 361/697 |
| 7,859,844 B2 * | 12/2010 | Nguyen et al. | ................ | 361/697 |
| 2007/0169948 A1 * | 7/2007 | Vidojevic et al. | ............... | 169/65 |
| 2011/0005781 A1 * | 1/2011 | Yasui et al. | ..................... | 169/54 |
| 2012/0235645 A1 * | 9/2012 | Nakashima et al. | .......... | 320/128 |
| 2013/0134928 A1 * | 5/2013 | Uchihashi et al. | ............ | 320/107 |

FOREIGN PATENT DOCUMENTS

| | | | |
|---|---|---|---|
| JP | 2003-190312 A | | 7/2003 |
| JP | 2005-243580 A | | 9/2005 |
| JP | 2007-27011 A | | 2/2007 |
| JP | 2009-219257 A | | 9/2009 |

\* cited by examiner

*Primary Examiner* — Richard V Muralidar
(74) *Attorney, Agent, or Firm* — Cantor Colburn LLP

(57) ABSTRACT

A secondary battery storage system rack is provided comprising a circuit block which is connected to an electric power line for exchanging electric power with the outside, a secondary battery block which is connected to the circuit block and which has a larger mass than the circuit block, and a storage body unit which stores, in the inside, the circuit block and the secondary battery block, wherein the secondary battery block and the circuit block are placed in one line along a direction of gravitational force, with the secondary battery block placed below the circuit block.

5 Claims, 6 Drawing Sheets

SECONDARY BATTERY STORAGE SYSTEM RACK WITH FIRE EXTINGUISHER DEVICE

CROSS-REFERENCE TO RELATED APPLICATION

The present application is a continuation application of International Application No. PCT/JP2011/067347, filed Jul. 28, 2011, the entire contents of which are incorporated herein by reference and priority to which is hereby claimed. The PCT/JP2011/067347 application claimed the benefit of the date of the earlier filed Japanese Patent Application Nos. JP2010-172110, filed Jul. 30, 2010, and JP2010-232044, filed Oct. 15, 2010, the entire contents of which are incorporated herein by reference, and priority to which is hereby claimed.

TECHNICAL FIELD

The present invention relates to a secondary battery storage system rack, and in particular, to a secondary battery storage system rack which stores a circuit block and a secondary battery block in the inside.

BACKGROUND ART

Effective usage of the energy is realized with the use of an electricity storage device such as a secondary battery. For example, recently, solar light power generation systems are actively being developed as eco-friendly, clean energy. Because a photoelectric conversion module which converts the solar light into electric power does not have an electricity storage function, the photoelectric conversion module is in some cases used in combination with a secondary battery. For example, the energy is effectively used by charge and discharge control to charge the electric power generated by the photoelectric conversion module into the secondary battery and to discharge the electricity from the secondary battery in response to a request from an external load or the like.

As the secondary battery, for example, a lithium ion secondary battery may be used. Because the secondary battery is used for a long period of time under various environments or the like, various safety measures are desirably provided. Although various safety measures are provided in, for example, the single structure of the lithium ion secondary battery or the like, it is preferable to further improve the safety when the secondary battery is used in a state where the secondary battery is stored in a rack or the like.

For example, Patent Literature 1 discloses, as a power supply device, a power supply device which stores a plurality of batteries having a safety valve in a casing, and which has a structure in which the casing is divided by a compartment wall into a battery chamber where the plurality of batteries are stored and an exhaust chamber where the gas discharged from the safety valve of the batteries stored in the battery chamber is exhausted. In this reference, a fire extinguisher which injects extinguishing agent or inert fluid to the exhaust chamber and a pressure sensor which detects an internal pressure of the exhaust chamber are provided, the fire extinguisher is controlled by the pressure sensor, and when the internal pressure of the exhaust chamber becomes higher than a set pressure, the fire extinguisher injects the extinguishing agent or the inert fluid into the exhaust chamber.

RELATED ART REFERENCES

Patent Literature

[Patent Literature 1] JP 2007-27011 A

DISCLOSURE OF INVENTION

Technical Problem

The solar light power generation system described above as an example structure for realizing effective usage of the energy using the electricity storage device such as the secondary battery includes, in addition to the secondary battery block having the secondary battery, a circuit block having various devices as constituent elements, such as a charge and discharge control circuit which executes charge and discharge control of the secondary battery block, a DC-AC converter circuit which executes electric power conversion to convert direct current power generated by the photoelectric conversion module into alternating current power and supply the alternating current power to system electric power of an electric power company or the like, and a disconnection circuit which disconnects the charging and discharging of the secondary battery block. It is convenient that the circuit block and the secondary battery block are collectively stored in a secondary battery storage system rack. In this case, in the space where the secondary battery storage system rack is placed, the space in the height direction may be effectively used to reduce the placement area, and in this case, it is desired that the secondary battery storage system rack be placed in a stable manner.

An advantage of the present invention is provision of a secondary battery storage system rack which is more stably placed.

Solution to Problem

According to one aspect of the present invention, there is provided a secondary battery storage system rack comprising a circuit block which is connected to an electric power line for exchanging electric power with the outside, a secondary battery block which is connected to the circuit block and which has a larger mass than the circuit block, a storage body unit which stores, in the inside, the circuit block and the secondary battery block, and a fire extinguisher device which stores an extinguishing agent and which supplies the extinguishing agent to the secondary battery block when fire extinction is necessary, wherein the fire extinguisher device, the circuit block, and the secondary battery block are placed in one line along a direction of force of gravity, with the fire extinguisher device placed above the circuit block and the secondary battery block placed below the circuit block, and the circuit block comprises an electric power distribution unit which converts input electric power which is input from the electric power line into charge electric power for charging the secondary battery block and converts discharge electric power discharged from the secondary battery block into output electric power which is output from the electric power line, and a disconnection circuit which is placed below the electric power distribution unit and which disconnects charging and discharging of the secondary battery block.

Advantageous Effects of Invention

According to the secondary battery storage system rack of various aspects of the present invention, the secondary battery block having a larger mass than the circuit block is placed on a lower position in the direction of force of gravity than the circuit block. With this structure, because the center of gravity lies on a lower part of the storage body unit, the secondary battery storage system rack can be stably placed. In addition, because the secondary battery block having a larger mass is placed in a lower part of the storage body unit, work on the secondary battery block can be executed at a lower position compared to the case where the secondary battery block is placed on an upper part of the storage body unit, and the maintenance work can be facilitated. In addition, because an extinguishing agent tank is placed on an upper side of the storage body unit, even if fire breaks out in the secondary battery block, the damage of the extinguishing agent tank can be reduced, and a more reliable fire extinguishing operation can be executed.

BEST MODE FOR CARRYING OUT THE INVENTION

Figure 1:
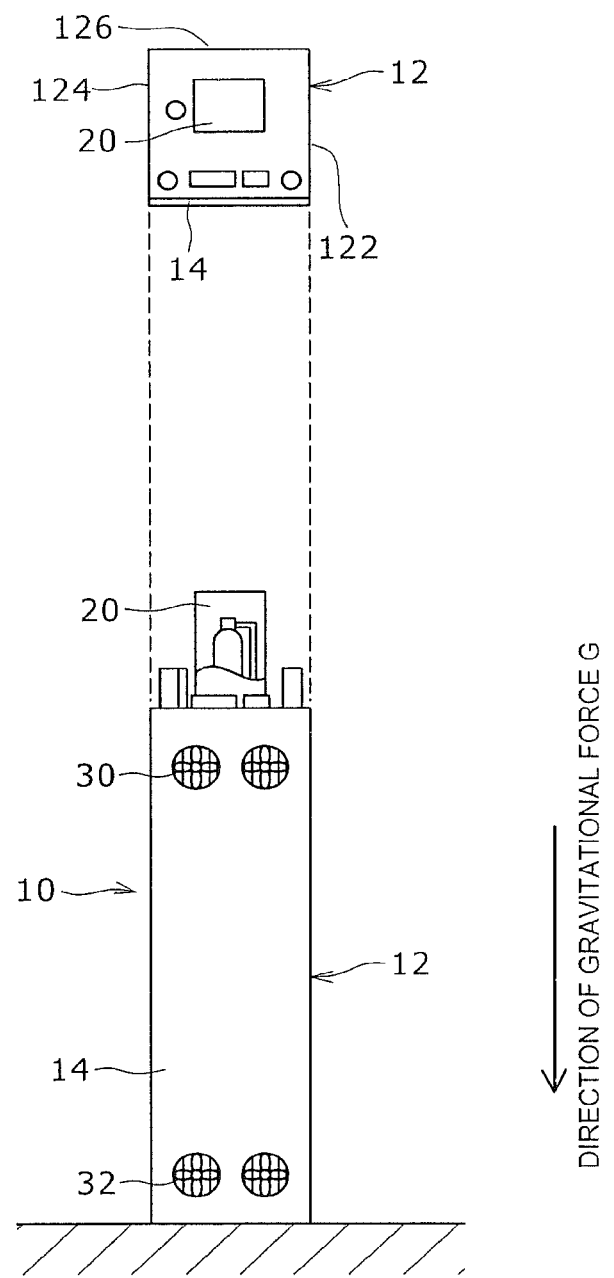
FIG. 1 is a diagram showing a front view and a top view of a secondary battery storage system rack according to a preferred embodiment of the present invention, with a front door closed.

A preferred embodiment of the present invention will now be described in detail with reference to the drawings. In the following description, a lithium ion secondary battery is explained as the secondary battery, but alternatively, other batteries which can be charged and discharged and which generate heat by an electrochemical reaction may be employed. For example, the secondary battery may be a nickel-metal hydride battery, a nickel-cadmium battery, a lead storage battery, a metal lithium secondary battery, or the like.

In addition, in the following description, calcium silicate plate is explained as the fire insulating member plate, but plates of other materials having suitable heat resistance, suitable heat insulation, and suitable strength may be used. For example, a ceramic plate of a suitable material may be used.

Moreover, the shape, material, or the like described below are merely exemplary for the purpose of explanation, and may be suitably changed according to the specification of the secondary battery storage system rack. For example, the shape and the number of the secondary batteries stored in the secondary battery block, and the shape, the number, or the like of the fire insulating member plate are merely exemplary.

In addition, in the following description, the same reference numeral is attached to similar elements in all drawings, and the explanation will not be repeated. Moreover, in the explanation in this text, the reference numerals which have been already used are referred to as necessary.

Figure 2:
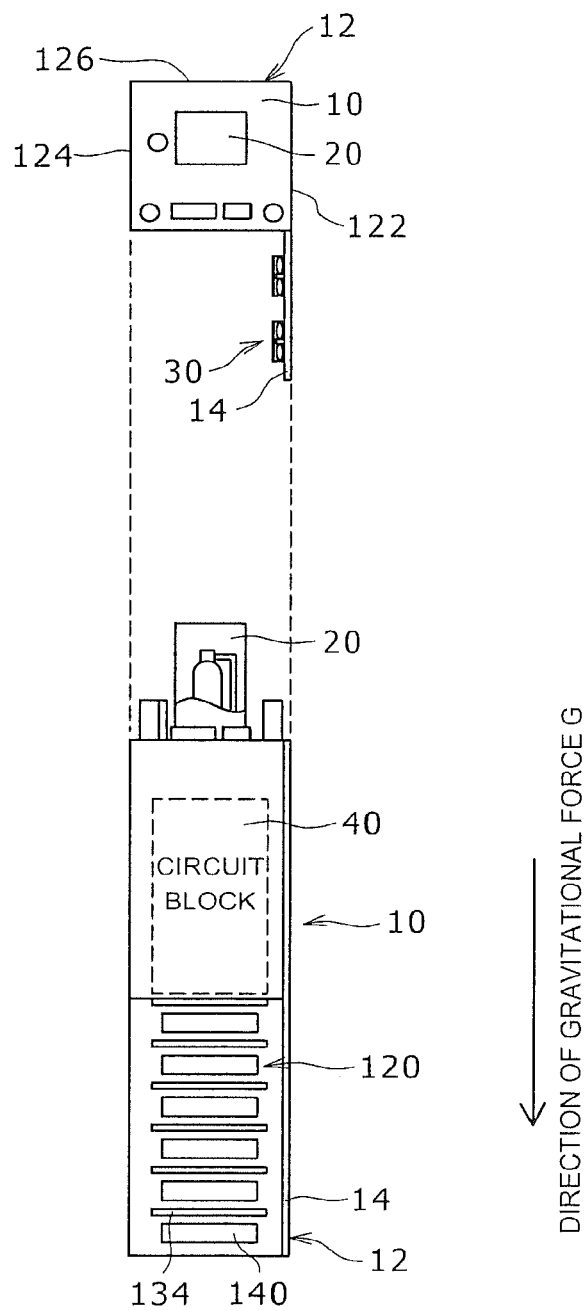
FIG. 2 is a diagram showing a front view and a top view of a secondary battery storage system rack according to a preferred embodiment of the present invention, with a front door opened.
Figure 3:
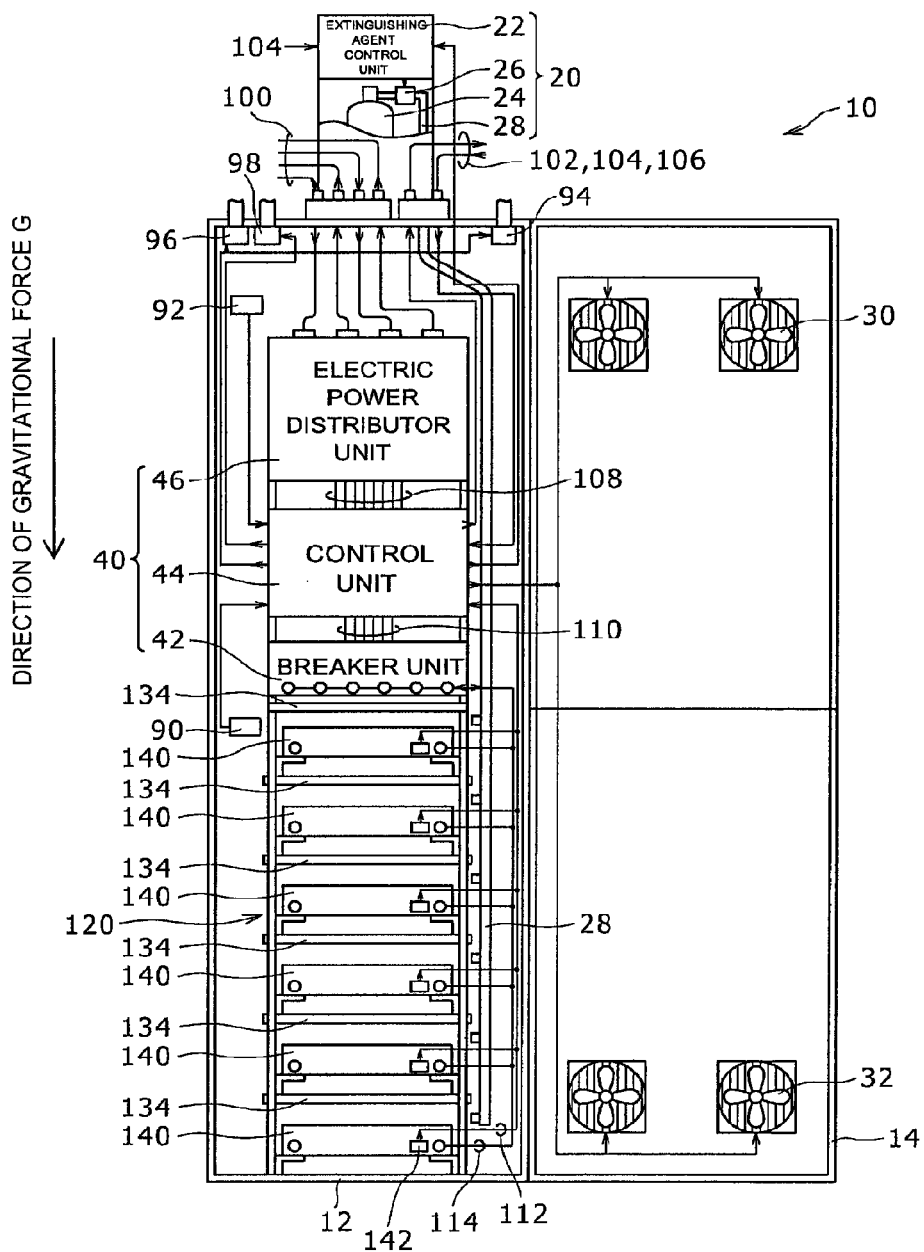
FIG. 3 is a diagram showing a specific placement relationship of the element of the secondary battery storage system rack according to a preferred embodiment of the present invention, with a front door opened.

FIG. 1 is a diagram showing a front view and a top view of a secondary battery storage system rack 10 in a state where a front door 14 is closed. FIG. 2 is a diagram showing a front view and a top view of the secondary battery storage system rack 10 in a state where the front door 14 is open. FIG. 3 is a diagram showing a specific placement relationship of elements of the secondary battery storage system rack 10 in a state where the front door 14 is open. The secondary battery storage system rack 10 comprises a storage body unit 12 and a fire extinguisher device 20.

The storage body unit 12 has a function as a rack which stores in the inside an intake valve 94, an exhaust valve 96, a pressure damper valve 98, a first smoke sensor 90, a second smoke sensor 92, a circuit block 40, and a secondary battery block 120. The storage body unit 12 has a box shape with an approximately square bottom surface and elongated along a direction of gravitational force G, with three sides surrounded by side wall members 122, 124, and 126 and the remaining side provided with the front door 14 which can be opened and closed. The side wall members 122, 124, and 126 and the front door 14 are formed using a material having a suitable strength such as, for example, a stainless steel member.

An intake fan unit 32 provided on a lower part of the front door 14 of the storage body unit 12 has a function to take in the air from the outside of the storage body unit 12 to the inside. In addition, an exhaust fan unit 30 provided on an upper part of the front door 14 has a function to discharge air from the inside of the storage body unit 12 to the outside. Each of the intake fan unit 32 and the exhaust fan unit 30 has an opening provided on the front door 14 and a fan mounted on the front door 14, matching the opening. Operations of the intake fan unit 32 and the exhaust fan unit 30 are controlled by a control unit 44 of the circuit block 40.

Figure 4:
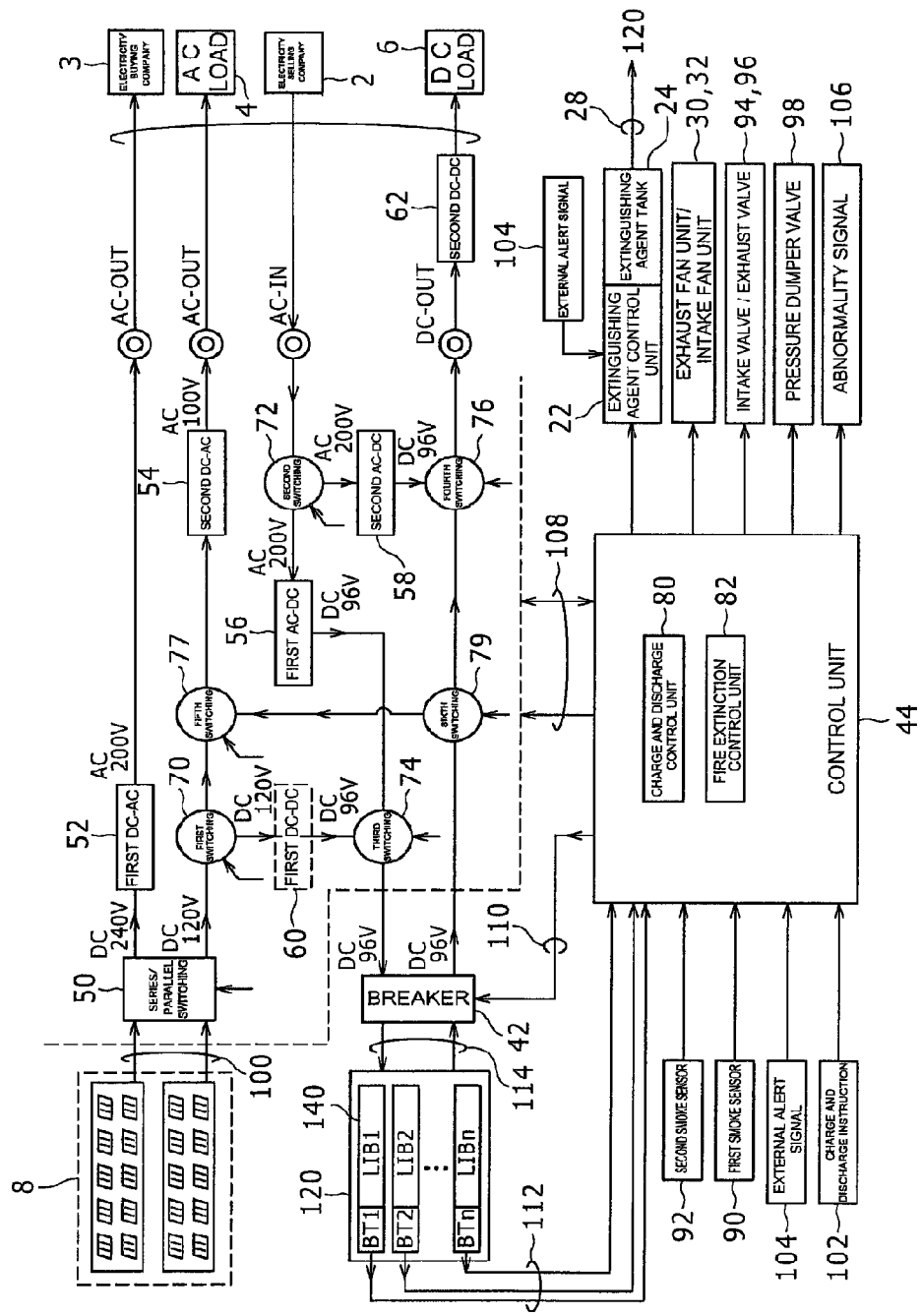
FIG. 4 is a diagram showing a connection relationship of elements related to a secondary battery storage system rack according to a preferred embodiment of the present invention.

FIG. 4 is a diagram showing a connection relationship of the elements stored in the storage body unit of the secondary battery storage system rack 10. Here, although these structures are not elements of the secondary battery storage system racks 10, an electricity selling company 2, an electricity buying company 3, an AC load 4, a second DC-DC converter circuit 62, a DC load 6, and a photoelectric conversion module 8 are shown as elements connected to the secondary battery storage system rack 10. In FIG. 4, a DC voltage which is output from the secondary battery block 120 through a breaker unit 42 is shown as DC 96 V, but this value is merely exemplary. As the DC voltage which is output from the secondary battery block 120 through the breaker unit 42 changes according to a voltage state of the secondary battery 140, the DC voltage changes in a range of, for example, about 78 V~about 104 V.

The electricity selling company 2 is an electric power company which sells, to the secondary battery storage system rack 10, electric power generated in a facility of the company or the like. The electricity buying company 3 is an electric power company which buys the electric power generated by the photoelectric conversion module 8 and supplied through the secondary battery storage system rack 10, and is shown here as a different company from the electricity selling company 2, but may alternatively be the same company as the electricity selling company 2.

The AC load 4 is a load device which is used in the facility in which the secondary battery storage system rack 10 is placed, and which operates by an alternating current power. The second DC-DC converter circuit 62 is an electric power conversion circuit which converts input direct current power to direct current power corresponding to the DC load 6 and outputs the direct current power. The DC load 6 is a load device which is used in the facility in which the secondary battery storage system rack 10 is placed and which operates with a direct current power. The AC load 4 and the DC load 6 are described herein as being used in the facility in which the secondary battery storage system rack 10 is placed, but alternatively, the AC load 4 and the DC load 6 may be used outside of the facility in which the secondary battery storage system rack 10 is placed. In addition, here, the second DC-DC converter circuit 62 is described as being provided outside of the secondary battery storage system rack 10, but alternatively, the second DC-DC converter circuit 62 may be provided in the secondary battery storage system rack 10.

The photoelectric conversion module 8 is a device for converting incident solar light into electric power and outputting the electric power. Here, the photoelectric conversion module 8 includes two photoelectric conversion units which convert the solar light into electric power with a direct current voltage of about 120 V and output the electric power.

As shown in FIGS. 1-3, the placement relationship of the elements placed in the storage body unit 12 is such that the secondary battery block 120 having a larger mass is placed below the circuit block 40 in a direction of gravitational force G. In other words, the circuit block 40 having a smaller mass than the secondary battery block 120 is placed above the secondary battery block 120 in the direction of gravitational force G. In this manner, with the secondary battery block 120 placed at a lowest position in the storage body unit 12, the center of gravity of the storage body unit 12 lies at a lower position, and thus the storage body unit 12 can be stably placed. In addition, with the secondary battery block 120 having the larger mass being placed on a lower part of the storage body unit 12, work on the secondary battery block 120 can be executed at a lower position compared to the case where the secondary battery block 120 is placed at an upper part of the storage body unit 12 having a box shape elongated along the direction of gravitational force G, and consequently, the maintenance work can be facilitated. Here, it is only sufficient that the secondary battery block 120 be placed on a lower part so that the center of gravity of the storage body unit 12 lies at a lower part, and other devices may be provided below the secondary battery block 120.

On an upper side of a ceiling part of the storage body unit 12, an electric power terminal unit for guiding an electric power line 100 for exchanging the electric power with the outside to the inside of the storage body unit 12 is provided. In the example configuration of FIG. 3, 4 lines including an input line and an output line of direct current power and an input line and an output line of alternating current power are shown as the electric power lines 100. This configuration is an exemplary configuration, and alternatively, electric power lines 100 of other configurations may be employed.

In addition, on an upper side of the ceiling part of the storage body unit 12, a signal terminal unit for guiding signal lines 102, 104, and 106 for exchanging signals with the outside into the storage body unit 12 is provided. In the example configuration of FIG. 3, a charge and discharge instruction signal line 102, an external alert signal line 104, and an abnormality signal line 106 are shown.

The charge and discharge instruction signal line 102 is a signal line for transmitting a signal for instructing charging and discharging of the secondary battery 120 from a control device or the like outside of the secondary battery storage system rack 10 to the control unit 44 of the circuit block 40 of the storage body unit 12. The external alert signal line 104 is a signal line for transmitting, to the control unit 44, an alert signal which is generated when a fire or the like occurs outside of the secondary battery storage system rack 10. The abnormality signal line 106 is a signal line for transmitting an abnormality signal to the control device or the like at the outside, the abnormality signal being generated by the control unit 44 when an abnormal temperature increase or the like occurs in the secondary battery block 120. These signal lines are exemplary, and alternatively, other signal lines may be provided.

The circuit block 40 comprises an electric power distributor unit 46, the control unit 44, and a breaker unit 42. These elements are placed along the flow of the electric power when the electric power is exchanged between the secondary battery block 120 of the secondary battery storage system rack 10 and the outside, with the electric power distributor unit 46 which is connected to the electric power line 100 at the uppermost position, the control unit 44 which controls the electric power distributor unit 46 and the breaker unit 42 at the middle position, and the breaker unit 42 which is connected to the secondary battery block 120 at the lowermost position. With such a configuration, the lines connecting the elements can be shortened, and electric power loss due to the line resistance can be inhibited. In the following description, of the two functions of the control unit 44, first, the structures of the circuit block 40 and the secondary battery block 120 related to the function of the charge and discharge control unit 80 will be described in detail, and the intake valve 94, the exhaust valve 96, the pressure dumper valve 98, the first smoke sensor 90, the second smoke sensor 92, and the fire extinguisher device 20 related to the function of a fire extinction control unit 82 of the control unit 44 will be described later. The circuit block 40 is described as having the electric power distributor unit 46, the control unit 44, and the breaker unit 42, but alternatively, not all of these elements need to be provided. Here, a mass of the circuit block 40 refers to a total mass of the elements of the circuit block 40.

The electric power distributor unit 46 comprises a series/parallel switching circuit 50, a first DC-AC converter circuit 52, a second DC-AC converter circuit 54, a first AC-DC converter circuit 56, a second AC-DC converter circuit 58, a first DC-DC converter circuit 60, a first switching circuit 70, a second switching circuit 72, a third switching circuit 74, a fourth switching circuit 76, a fifth switching circuit 77, and a sixth switching circuit 79.

The series/parallel switching circuit 50 is a switching circuit which switches between a connection of the photoelectric conversion module 8 and the first DC-AC converter circuit 52 and a connection of the photoelectric conversion module 8 and the first switching circuit 70.

The first DC-AC converter circuit 52 is an electric power conversion circuit which connects the series/parallel switching circuit 50 and the electricity buying company 3, and converts direct current power to alternating current power.

The second DC-AC converter circuit 54 is an electric power conversion circuit which connects the fifth switching circuit 77 and the AC load 4, and converts direct current power to alternating current power.

The first AC-DC converter circuit 56 is an electric power conversion circuit which connects the second switching circuit 72 and the third switching circuit 74, and converts alternating current power to direct current power.

The second AC-DC converter circuit 58 is an electric power conversion circuit which connects the second switching circuit 72 and the fourth switching circuit 76, and converts alternating current power to direct current power.

The first DC-DC converter circuit 60 is an electric power conversion circuit which connects the first switching circuit 70 and the third switching circuit 74, converts input direct current power to direct current power suitable for charging of the secondary battery 140, and outputs the converted direct current power.

The first switching circuit 70 is a switching circuit which switches between a connection of the series/parallel switching circuit 50 and the first DC-DC converter circuit 60 and a connection of the series/parallel switching circuit 50 and the fifth switching circuit 77.

The second switching circuit 72 is a switching circuit which switches between a connection of the electricity selling company 2 and the first AC-DC converter circuit 56 and a connection of the electricity selling company 2 and the second AC-DC converter circuit 58.

The third switching circuit 74 is a switching circuit which switches between a connection of the first DC-DC converter circuit 60 and the breaker unit 42 and a connection of the first AC-DC converter circuit 56 and the breaker unit 42.

The fourth switching circuit 76 is a switching circuit which switches between a connection of the sixth switching circuit 79 and the second DC-DC converter circuit 62 and a connection of the second AC-DC converter circuit 58 and the second DC-DC converter circuit 62.

The fifth switching circuit 77 is a switching circuit which switches between a connection of the first switching circuit 70 and the second DC-AC converter circuit 54 and a connection of the sixth switching circuit 79 and the second DC-AC converter circuit 54.

The sixth switching circuit 79 is a switching circuit which switches between a connection of the breaker unit 42 and the fourth switching circuit 76 and a connection of the breaker unit 42 and the fifth switching circuit 77.

The control unit 44 placed at a lower position than the electric power distributor unit 46 comprises the charge and discharge control unit 80 and the fire extinction control unit 82. The charge and discharge control unit 80 has a function to control the electric power distributor unit 46 based on the charge and discharge instruction transmitted by the charge and discharge instruction signal line 102, so that the electric power is charged and discharged between the outside and the secondary battery block 120. The fire extinction control unit 82 has a function to control the fire extinguisher device 20 based on the external alert signal or the like transmitted by the external alert signal line 104, so that the extinguishing agent is supplied from the fire extinguisher device 20 to the secondary battery block 120. The functions of the charge and discharge control unit 80 and the fire extinction control unit 82 of the control unit 44 will be described later in detail when the operations of the secondary storage system rack 10 are described. The control unit 44 and the electric power distributor unit 46 are connected by a signal line 108, and the control unit 44 and the breaker unit 42 are connected by a signal line 110.

The breaker unit 42 placed at a position lower than the control unit 44 connects/disconnects between the third switching circuit 74 and the secondary battery block 120 and between the sixth switching circuit 79 and the secondary battery block 120, and the connection/disconnection is controlled by the control of the control unit 42.

The secondary battery block 120 placed at a position lower than the breaker unit 42 comprises a plurality of secondary batteries 140 for charging and discharging, and a fire insulating plate member 134 for inhibiting heat conduction between the secondary batteries 140. As the secondary battery 140, for example, a lithium ion secondary battery having a negative electrode formed with a carbon material, an electrolyte solution for movement of the lithium ion, and a positive electrode active material to which the lithium ion can reversibly enter or exit may be employed. As the fire insulating plate member 134, for example, a calcium silicate plate having a superior heat resistance, a superior heat insulation characteristic, and a superior strength may be used. Although the secondary battery block 120 is described as having both the plurality of secondary batteries 140 and the heat insulating plate member 134, alternatively, a configuration may be employed in which the secondary battery block 120 does not include the heat insulating plate member 134 and includes only the secondary batteries 140. Here, the mass of the secondary battery block 120 refers to a total mass of the secondary batteries 140 when only the secondary batteries 140 are included, or to a total mass of the secondary batteries 140 and the heat insulating plate member 134 when the secondary batteries 140 and the heat insulating plate member 134 are included.

Each secondary battery 140 comprises an electrode which is connected to the breaker unit 42 through an electric power line 114, and a temperature sensor 142 which detects a temperature state of the inside. The temperature sensor 142 is connected to the control unit 44 by a signal line 112, and transmits a temperature signal (temperature information) to the control unit 44.

Next, an operation of the charge and discharge control unit 80 of the control unit 44 of the secondary battery storage system rack 10 will be described. As the types of the charge and discharge instructions transmitted by the charge and discharge instruction signal line 102, there exist 6 modes, that is, a first mode through a sixth mode, as will be described below. The first mode is a mode in which the electric power generated by the photoelectric conversion module 8 is charged to the secondary battery block 120. The second mode is a mode in which the electric power generated by the photoelectric conversion module 8 is supplied to the AC load 4. The third mode is a mode in which the electric power generated by the photoelectric conversion module 8 is supplied to the electricity buying company 3. The fourth mode is a mode in which the electric power supplied from the electricity selling company 2 is charged to the secondary battery block 120. The fifth mode is a mode in which the electric power discharged from the secondary battery block 120 is supplied to the AC load 4. The sixth mode is a mode in which the electric power discharged from the secondary battery block 120 is supplied to the DC load 6.

When the charge and discharge instruction is the first mode, the charge and discharge control unit 80 switches the series/parallel switching circuit 50 so that the outputs from the two photoelectric conversion units of the photoelectric conversion module 8 are set parallel to each other and an electric power of a direct current voltage of about 120 V is output. The charge and discharge control unit switches the first switching circuit 70 so that the electric power of the direct current voltage of about 120 V supplied by the series/parallel switching circuit 50 is supplied to the first DC-DC converter circuit 60 and also controls the first DC-DC converter circuit 60 so that the electric power of the direct current voltage of about 120 V is dropped to the electric power suitable for charging the secondary battery 140. The charge and discharge control unit 80 also switches the third switching circuit 74 so that the electric power of a direct current voltage of 96 V output by the first DC-DC converter circuit 60 is supplied to the breaker unit 42, and controls the connection of the breaker unit 42 so that the supplied electric power is further supplied to the secondary battery block 120 as a charge electric power. Here, a configuration is described in which the electric power of the direct current voltage of about 120 V is dropped to, for example, an electric power of the direct current voltage of 96 V using the first DC-DC converter circuit 60, but alternatively, the first DC-DC converter circuit 60 may be omitted and the electric power of the direct current voltage of about 120 V may be set as the charge electric power without further processing.

When the charge and discharge instruction is the second mode, the charge and discharge control unit 80 switches the series/parallel switching circuit 50 so that the outputs from the two photoelectric conversion units of the photoelectric conversion module 8 are set in parallel with each other and an electric power of a direct current voltage of about 120 V is output. The charge and discharge control unit 80 switches the first switching circuit 70 so that the electric power of the direct current voltage of about 120 V supplied by the series/parallel switching circuit 50 is supplied to the fifth switching circuit 77, and switches the fifth switching circuit 77 so that the electric power is further supplied to the second DC-AC converter circuit 54. The charge and discharge control unit 80 controls the second DC-AC converter circuit 54 so that the electric power of the direct current voltage of about 120 V supplied from the fifth switching circuit 77 is converted into an electric power of an alternating current voltage of 100 V and supplied to the AC load 4.

When the charge and discharge instruction is the third mode, the charge and discharge control unit 80 switches the series/parallel switching circuit 50 so that the outputs of the two photoelectric conversion units of the photoelectric conversion module 8 are set in series with each other, and an electric power of a direct current voltage of 240 V is output. The charge and discharge control unit 80 controls the first DC-AC converter circuit 52 so that the electric power of the direct current voltage of 240 V supplied by the series/parallel switching circuit 50 is converted into an electric power of an alternating current voltage of 200 V and supplied to the electricity buying company 3.

When the charge and discharge instruction is the fourth mode, the charge and discharge control unit 80 switches the second switching circuit 72 so that the electric power supplied from the electricity selling company 2 is supplied to the first AC-DC converter circuit 56, and controls the first AC-DC converter circuit 56 so that the electric power of the alternating current voltage of 100 V is converted into an electric power suitable for charging the secondary battery 140. The charge and discharge control unit 80 switches the third switching circuit 74 so that the electric power of the direct current voltage of 96 V output from the first AC-DC converter circuit 56 is supplied to the breaker unit 42, and controls the connection of the breaker unit 42 so that the supplied electric power is supplied to the secondary battery block 120 as the charge electric power.

When the charge and discharge instruction is the fifth mode, the charge and discharge control unit 80 controls the connection of the breaker unit 42 so that the discharge electric power discharged from the secondary battery block 120 is supplied to the sixth switching circuit 79. The charge and discharge control unit 80 switches the sixth switching circuit 79 so that the electric power supplied to the sixth switching circuit 79 is supplied to the fifth switching circuit 77. The charge and discharge control unit 80 switches the fifth switching circuit 77 so that the electric power supplied to the fifth switching circuit 77 is supplied to the second DC-AC converter circuit 54, and control the second DC-AC converter circuit 54 so that the electric power of the direct current voltage of 96 V supplied from the fifth switching circuit 77 is converted to electric power of an alternating current voltage of 100 V and supplied to the AC load 4.

When the charge and discharge instruction is the sixth mode, the charge and discharge control unit 80 controls the connection of the breaker unit 42 so that the discharge electric power discharged from the secondary battery block 120 is supplied to the sixth switching circuit 79. The charge and discharge control unit 80 switches the sixth switching circuit 79 so that the electric power supplied to the sixth switching circuit 79 is supplied to the fourth switching circuit 76. The charge and discharge control unit 80 switches the fourth switching circuit 76 so that the electric power supplied from the sixth switching circuit 79 to the fourth switching circuit 76 is supplied to the second DC-DC converter circuit 62. In this process, in order to prepare for a case where the discharge electric power from the secondary battery block 120 is not sufficient, the second switching circuit 72 may be switched so that the electric power supplied from the electricity selling company 2 is supplied to the second AC-DC converter circuit 58, and the second AC-DC converter circuit may be controlled to convert electric power of an alternating current voltage of 200 V to an electric power corresponding to the discharging from the secondary battery 140 and output to the fourth switching circuit 76. The electric power supplied from the fourth switching circuit 76 is converted by the second DC-DC converter circuit 62 and supplied to the DC load 6.

Next, the first smoke sensor 90, the second smoke sensor 92, the fire extinguisher device 20, the intake valve 94, the exhaust valve 96, and the pressure damper valve 98 related to the function of the fire extinction control unit 82 of the control unit 44 will be described in detail.

The first smoke sensor 90 and the second smoke sensor 92 are smoke detection sensors which detect smoke in the event that the second battery 140 becomes an abnormal state exceeding a predetermined permitted temperature, fire breaks out, and smoke is generated due to the fire. The first smoke sensor 90 is placed in the storage body unit 12 and at an upper region of where the secondary battery block 120 is placed, and the second smoke sensor 92 is placed in the storage body unit 12 near an uppermost part. The detection results of the first smoke sensor 90 and the second smoke sensor 92 are transmitted to the control unit 44 of the circuit block 40.

The fire extinguisher device 20 functions as fire extinguishing equipment placed on an upper side of the storage body unit 12. The fire extinguisher device 20 comprises an extinguishing agent control unit 22, an extinguishing agent tank 24, an extinguishing agent supply valve 26, and an extinguishing agent supply pipe 28.

The extinguishing agent tank 24 is a tank which stores the extinguishing agent. The extinguishing agent supply pipe 28 is a pipe for supplying the extinguishing agent of the extinguishing agent tank 24 to the secondary battery block 120, and is placed extending from the fire extinguisher device 20 placed on the upper side of the storage body unit 12 toward the secondary battery block 120 placed on a lower part of the storage body unit 12. For the extinguishing agent to be filled in the extinguishing agent tank 24, a material having a larger mass per unit volume than the mass per unit volume of the air and having an electrically insulating characteristic is used. For example, $CF_3CF_2C(O)CF(CF_3)_2$ may be used, which generates, a volatile trifluoromethyl group ($CF_3^*$) by thermal decomposition after injection.

With the extinguishing agent tank 24 placed at the upper side of the storage body unit 12, that is, at the upper side of the ceiling part of the storage body unit 12, the damage to the extinguishing agent tank when fire occurs in the secondary battery block 120 can be reduced compared to a configuration where the extinguishing agent tank 24 is placed near the secondary battery block 120, and a more reliable fire extinguishing operation can be executed.

The extinguishing agent supply valve 26 allows the extinguishing agent to be supplied from the extinguishing agent tank 24 to the extinguishing agent supply pipe 28 when opened, and stops the supply of the extinguishing agent from the extinguishing agent tank 24 to the extinguishing agent supply pipe 28 when closed. The extinguishing agent supply valve 26 is controlled to be opened and closed by the extinguishing agent control unit 22.

The extinguishing agent control unit 22 opens the extinguishing agent supply valve 26 when receiving an external alert signal indicating a fire extinction start signal which is input through the external alert signal line 104 or receiving a fire extinction start signal from the control unit 44. The extinguishing agent control unit 22 closes the extinguishing agent supply valve 26 when receiving a fire extinction completion signal from the control unit 44.

The intake valve 94 and the exhaust valve 96 are attached to the ceiling part of the storage body unit 12, and are open/close valves which are used to take in and discharge, with an external suction pump (not shown), the used extinguishing agent after the fire extinction after an abnormality occurs in the secondary battery block 120 and the fire extinguisher device 20 is operated. Operations of the intake valve 94 and the exhaust valve 96 are controlled by the control unit 44 of the circuit block 40. More specifically, under normal conditions, the intake valve 94 and the exhaust valve 96 are closed, and after the fire extinction, the intake valve 94 is opened to the atmosphere and the exhaust valve 96 is opened and connected to the suction pump (not shown). With this process, the air is taken in from the intake valve 94 into the storage body unit 12, and the used extinguishing agent is discharged to the outside by the suction pump through the exhaust valve 96 along with the air.

The pressure damper valve 98 is a valve which is opened when the internal pressure of the storage body unit 12 exceeds a predetermined pressure value which is defined in advance, to set the pressure value of the storage body unit 12 to a normal value.

Next, an operation of the fire extinction control unit 82 of the control unit 44 of the secondary battery storage system rack 10 will be described. The fire extinction control unit 82 applies disconnection control of the breaker unit 42 when a temperature signal from the temperature sensor 142 of each secondary battery 140 of the secondary battery block 120 exceeds a predetermined threshold temperature, to stop charging and discharging of the secondary battery block 120, and outputs an abnormality signal indicating that there is a possibility of an abnormal state of the secondary battery 140 through the abnormality signal line 106.

The fire extinction control unit 82 outputs a fire extinction start signal to the extinguishing agent control unit 22 to supply the extinguishing agent from the fire extinguisher device 20 to the secondary battery block 120 when receiving a smoke detection signal indicating detection of a smoke from the first smoke sensor 90 or the second smoke sensor 92, or when the temperature signal received from each secondary battery 140 indicates an abnormal temperature exceeding the predetermined threshold temperature. The fire extinction control unit 82 also outputs the fire extinction start signal when receiving the external alert signal transmitted through the external alert signal line 104. The fire extinction control unit 82 further judges, after outputting the fire extinction start signal, whether or not the fire extinction by the fire extinguisher device 20 is completed based on the temperature signal from each secondary battery 140 or the like, and when judging that the fire extinction is completed, outputs a fire extinction completion signal to the extinguishing agent control unit 22. In this manner, when the secondary battery block 120 is judged as being in the abnormality state, the extinguishing agent can be supplied to the secondary battery block 120 in preparation for the event of fire.

The fire extinction control unit 82 then opens the intake valve 94 and the exhaust valve 96 in order to discharge the used extinguishing agent when the fire extinction is completed, so that the intake valve 94 is opened to the atmosphere and the exhaust valve 96 is opened and connected to the suction pump (not shown). With this configuration, air is taken in from the intake valve 94 into the storage body unit 12, and the used extinguishing agent is discharged to the outside by the suction pump through the exhaust valve 96 along with the air.

As described above, the circuit block 40 and the secondary battery block 120 are placed in one line along the direction of gravitational force G, and the secondary battery block 120 is placed below the circuit block 40. Therefore, even in the case where the fire extinguisher device 20 storing the extinguishing agent having a larger mass per unit volume than the air is placed on an upper side of the ceiling part of the storage body unit 12 and the extinguishing agent is supplied from the upper part of the storage body unit 12, the extinguishing agent can be easily wholly sent to the secondary battery block 120 provided on a lower part of the storage body unit 12.

As described above, in the storage body unit 12, the electric power distributor unit 46, the breaker unit 42, the control unit 44, and the secondary battery block 120 are placed in one line along the direction of gravitational force G, and the fire extinguisher device 20 is placed on an upper side of the ceiling part of the storage body unit 12. Therefore, the bottom surface area of the storage body unit 12 can be reduced and the placement region can be reduced.

Figure 5:
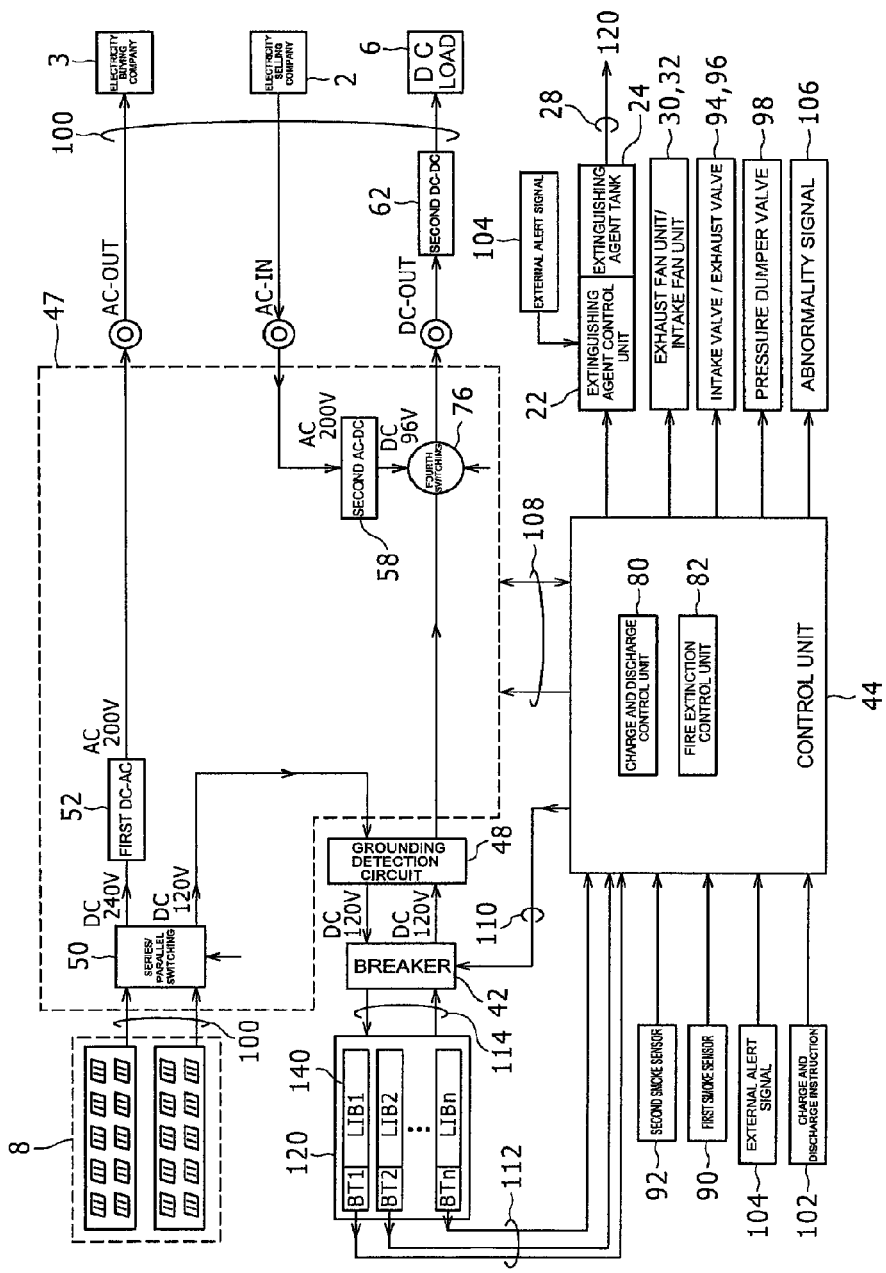
FIG. 5 is a diagram showing a connection relationship of elements related to an alternative configuration of a secondary battery storage system rack according to a preferred embodiment of the present invention.

Next, a secondary battery storage system rack 11 which is an alternative configuration of the secondary battery storage system rack 10 will be described. A difference between the secondary battery storage system rack 11 and the secondary battery storage system rack 10 is in an electric power distributor unit 47 and a grounding detection circuit 48 of a circuit block 41, and this difference will be primarily explained. FIG. 5 is a diagram showing a connection relationship of elements stored in the storage body unit 12 of the secondary battery storage system rack 11.

The electric power distributor unit 47 comprises the series/parallel switching circuit 50, the first DC-AC converter circuit 52, the second AC-DC converter unit 58, and the fourth switching circuit 76. In other words, the electric power distributor unit 47 differs from the electric power distributor unit 46 in that the electric power distributor unit 47 does not have the first switching circuit 70, the first DC-DC converter circuit 60, the third switching circuit 74, the fifth switching circuit 77, the sixth switching circuit 79, the first AC-DC converter circuit 56, the second DC-AC converter circuit 54, and the second switching circuit 72. FIG. 5 differs from FIG. 4 in that FIG. 5 does not show the AC load 4 which is described in FIG. 4 as a structure to be connected to the secondary battery storage system rack 10.

The grounding detection circuit 48 is a circuit which detects grounding of a positive electrode bus line and a negative electrode bus line connected to elements including the series/parallel switching circuit 50, the first DC-AC converter circuit 52, the second AC-DC converter circuit 58, and the fourth switching circuit 76.

Figure 6:
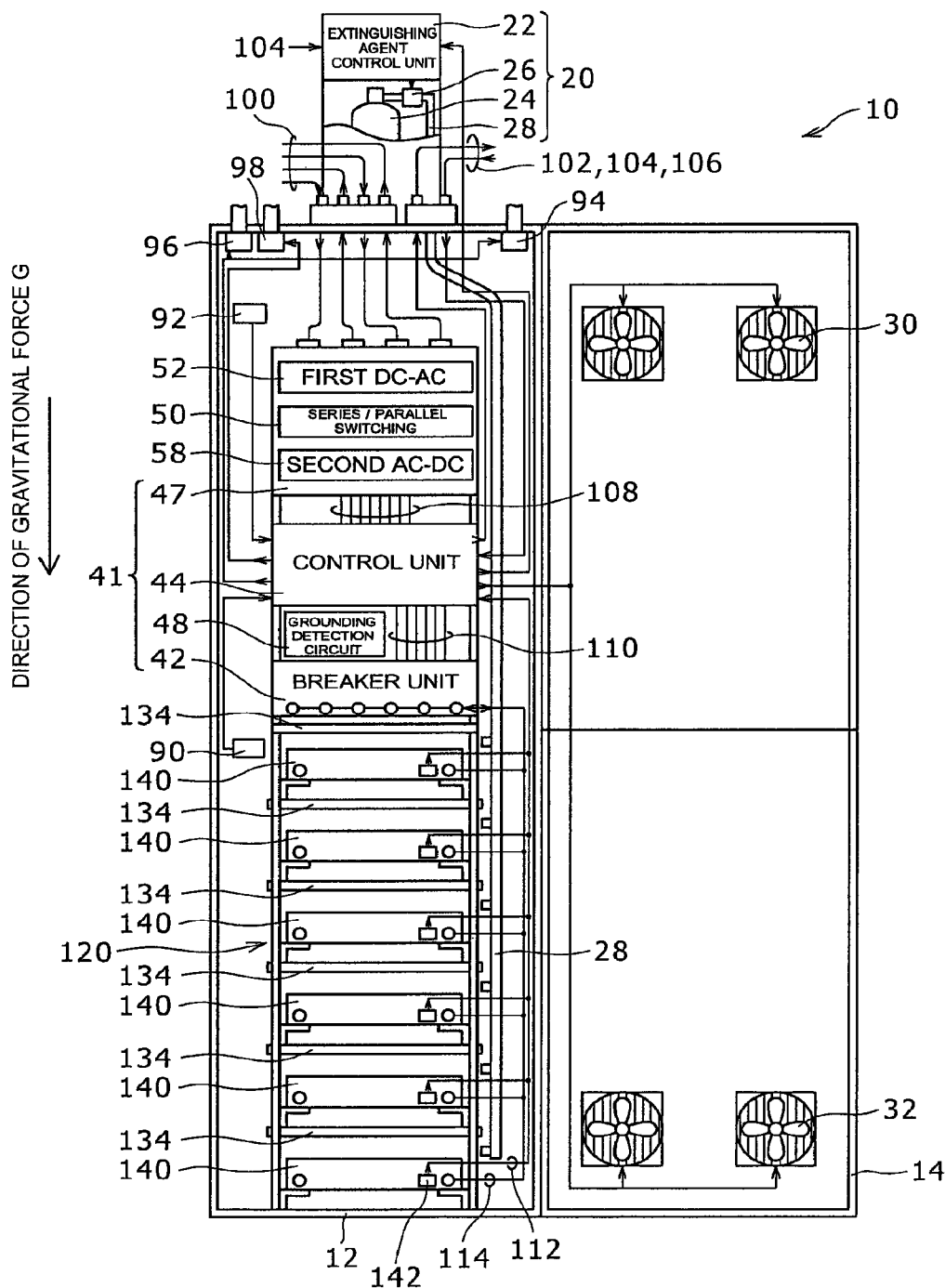
FIG. 6 is a diagram showing a specific placement relationship of elements of an alternative configuration of a secondary battery storage system rack according to a preferred embodiment of the present invention, with a front door opened.

FIG. 6 is a diagram showing a specific placement relationship of the elements of the secondary battery storage system rack 11 when the front door 14 is open. The placement relationship of the elements of the secondary battery storage system rack 11 is such that the circuit block 41 and the secondary battery block 120 are placed in one line along the direction of gravitational force G, with the circuit block 41 placed above the secondary battery block 120.

With regard to the placement relationship of elements of the circuit block 41, the electric power distributor unit 47, the control unit 44, the grounding detection circuit 48, and the breaker unit 42 are placed in one line along the direction of gravitational force G. Of the elements of the circuit block 41, the electric power distributor unit 47 is placed at an uppermost position, the control unit 44 is placed below the electric power distributor unit 47, the grounding detection circuit 48 is placed below the control unit 44, and the breaker unit 42 is placed below the grounding detection circuit 48. Because the circuit block is placed above the secondary battery block 120, the breaker unit 42 is placed above the secondary battery block 120.

With regard to the placement relationship of the elements of the electric power distributor unit 47, the first DC-AC converter circuit 52, the series/parallel switching circuit 50, and the second AC-DC converter circuit 58 are placed in one line along the direction of gravitational force G. Of the elements of the electric power distributor unit 47, the first DC-AC converter circuit 52 is placed at the uppermost position, the series/parallel switching circuit 50 is placed below the first DC-AC converter circuit 52, and the second AC-DC converter circuit 58 is placed below the series/parallel switching circuit 50. Because the electric power distributor unit 47 is placed above the control unit 44 as described above, the second AC-DC converter circuit 58 is placed above the control unit 44.

Similar to the secondary battery storage system rack 10, in the secondary battery storage system rack 11 also, the circuit block 40 and the secondary battery block 120 are placed in one line along the direction of gravitational force G, and the secondary battery block 120 is placed below the circuit block 40. Therefore, even in a configuration where the fire extinguisher device 20 storing the extinguishing agent having a larger mass per unit volume than the air is placed on the upper side of the ceiling part of the storage body unit 12 and the extinguishing agent is supplied from the upper part of the storage body unit 12, the extinguishing agent can be easily wholly supplied to the secondary battery block 120 provided at a lower part of the storage body unit 12.

Similar to the secondary battery storage system rack 10, in the secondary battery storage system rack 11 also, in the storage body unit 12, the electric power distributor unit 47, the breaker unit 42, the control unit 44, the grounding detection circuit 48, and the secondary battery block 120 are placed in one line along the direction of gravitational force G and the fire extinguisher device 20 is placed on an upper side of the ceiling part of the storage body unit 12. Therefore, the bottom surface area of the storage body unit 12 can be reduced and the placement region can be reduced.

In addition, as described above, in the secondary battery storage system rack 11, the circuit block 41 including the first DC-AC converter circuit 52, the series/parallel switching circuit 50, the second AC-DC converter circuit 58, and the grounding detection circuit 48 is placed above the secondary battery block 120. With this configuration, for example, even if heat is generated when the first DC-AC converter circuit 52, the series/parallel switching circuit 50, the second AC-DC converter circuit 58, and the grounding detection circuit 48 operate, the heat rises to the side of the ceiling part of the storage body unit 12, and the secondary battery block 120 can be protected from the heat.

In the above description, the control unit 44 is described as being placed below the electric power distributor unit 46 or 47, but the present invention is not limited to such a placement relationship. A reason for this is that although the electric power distributor unit 46 or 47, the grounding detection circuit 48, the breaker unit 42, and the secondary battery block 120 are placed in the storage body unit 12 according to the direction of flow of the electric power, the control unit 44 is not a structure through which the electric power flows.

The invention claimed is:

1. A secondary battery storage system rack, comprising:
   a circuit block which is connected to an electric power line for exchanging electric power externally;
   a secondary battery block which is connected to the circuit block and which has a larger mass than the circuit block;
   a storage body unit which stores, inside, the circuit block and the secondary battery block; and
   a fire extinguisher device which stores an extinguishing agent and which supplies the extinguishing agent to the secondary battery block when fire extinction is necessary, wherein
   the fire extinguisher device, the circuit block, and the secondary battery block are placed in one line along a direction of gravitational force, with the fire extinguisher device placed above the circuit block and the secondary battery block placed below the circuit block, and
   the circuit block comprises:
   an electric power distribution unit which converts input electric power which is input from the electric power line into charge electric power for charging the secondary battery block and converts discharge electric power discharged from the secondary battery block into output electric power which is output from the electric power line; and
   a disconnection circuit which is placed below the electric power distribution unit and which disconnects charging and discharging of the secondary battery block.

2. The secondary battery storage system rack according to claim 1, wherein
   the circuit block further comprises a control unit which is placed below the electric power distribution unit and which controls the electric power distribution unit for applying charge and discharge control of the secondary battery block.

3. The secondary battery storage system rack according to claim 1, wherein
   the fire extinguisher device supplies the extinguishing agent having a larger mass per unit volume than the air from an upper part of the storage body unit toward a lower part of the storage body unit.

4. The secondary battery storage system rack according to claim 1, wherein
   the electric power distribution unit comprises:
   a series/parallel switching circuit which switches between a series connection and a parallel connection for a plurality of photoelectric conversion units;
   a first electric power conversion circuit which converts direct current power which is output when the plurality of photoelectric conversion units are connected in series into alternating current power and supplies the converted alternating current power to the outside; and a second electric power conversion circuit which converts alternating current power which is supplied from the outside into direct current power.

5. The secondary battery storage system rack according to any one of claim 1, further comprising:

a grounding detection circuit which detects grounding of a positive electrode bus line or a negative electrode bus line connected to elements stored in the storage body unit, wherein the grounding detection circuit is placed above the secondary battery block.

* * * * *